No. 744,176. PATENTED NOV. 17, 1903.
H. DEL MAR.
FASTENING FOR MAIL TUBES.
APPLICATION FILED OCT. 24, 1902.
NO MODEL.
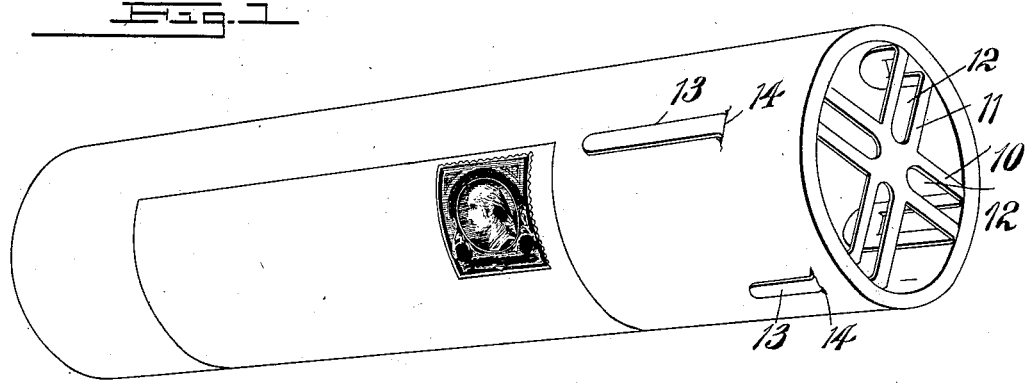
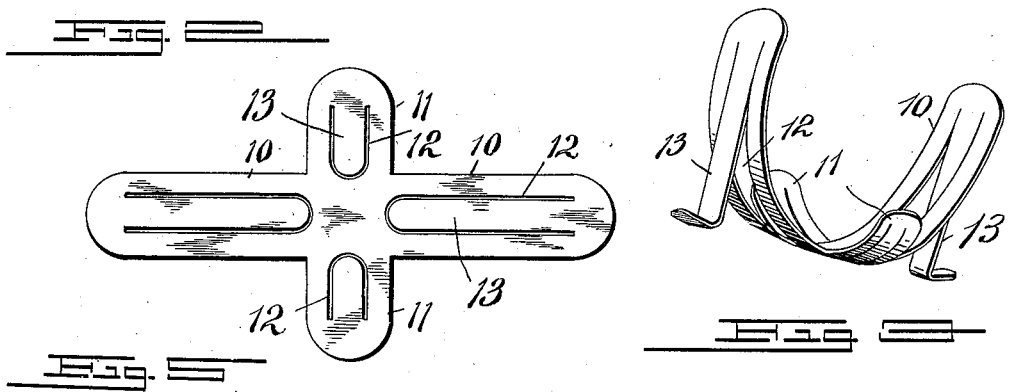
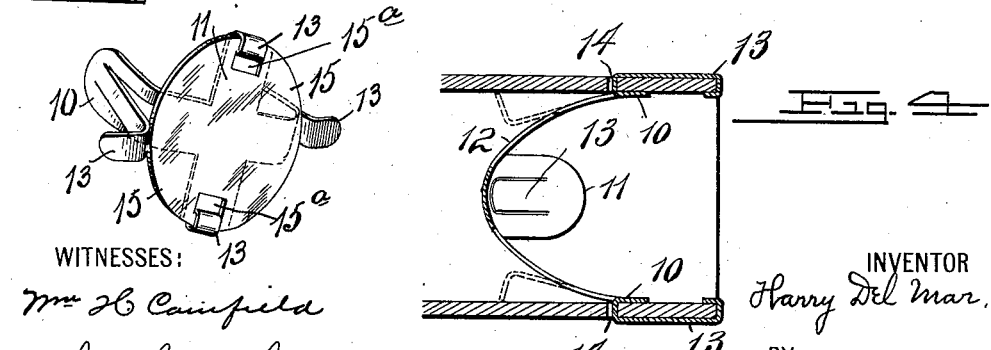
WITNESSES:
Wm H Canfield
John Carolan
INVENTOR
Harry Del Mar,
BY
W. B. Hutchinson,
ATTORNEY No. 744,176. Patented November 17, 1903.

UNITED STATES PATENT OFFICE.

HARRY DEL MAR, OF NEW YORK, N. Y.

FASTENING FOR MAIL-TUBES.

SPECIFICATION forming part of Letters Patent No. 744,176, dated November 17, 1903.

Application filed October 24, 1902. Serial No. 128,530. (No model.)

*To all whom it may concern:*

Be it known that I, HARRY DEL MAR, of the city, county, and State of New York, have invented certain new and useful Improvements in Fastenings for Mail-Tubes, of which the following is a full, clear, and exact description.

My invention relates to improvements in that class of devices which are adapted to close the ends of mail-tubes or similar things to the end that the matter in the mail-tube cannot be accidentally displaced and lost.

It is quite a common practice to fasten matter in a mail-tube by inserting a cord through the tube and then tying the contents with the cord or by fastening paper in the tube ends and similar ways; but these and other devices used for the purpose are more or less cumbersome and objectionable.

The primary object of my invention is to produce a simple and cheap fastening which can be stamped out of any suitable metal, which can be easily inserted and fastened in the ends of the tube, which will thus hold the contents against displacement, and which can be easily and speedily removed without injury to the tube when the contents of the latter are to be taken out.

To these ends my invention consists of a mail-tube fastening, the construction of which will be hereinafter described and claimed.

Reference is to be had to the accompanying drawings, forming a part of this specification, in which similar figures of reference refer to similar parts throughout the several views.

Figure 1 is a perspective view of a mail-tube with my improved fastening therein. Fig. 2 is a detail of the fastening. Fig. 3 is a perspective view of the device partially doubled, so as to be inserted in a tube. Fig. 4 is a detail sectional view showing the application of the device to a tube end, and Fig. 5 is a perspective view of a slightly-modified form of the device.

The fastening embodying my invention can be stamped out of any suitable sheet metal—such as tin, brass, iron, &c.—and it should be light and flexible. It is constructed with radial arms, and I preferably make it in the form of a cross, as shown, having two longer arms 10 and two shorter arms 11, both of which can be easily doubled over and inserted in the mouth of a tube, as in Fig. 1. In order that the arms may be inserted easily and without friction or any tearing effect, I preferably make the ends rounding, as illustrated; but obviously this is not absolutely necessary. Moreover, while I show two arms it will be seen that any number embodying a plurality of arms can be used. The arms are longitudinally slotted, as shown at 12, so as to form the tongues 13, which are thus struck up from the arms and which have their free ends toward the center. When the device is to be used, the outer ends of the arms 10 and 11 are doubled over, so that the fastening can be easily pushed into the tube, as in Fig. 1, and the tongues 13 are lifted out and inserted in slots 14 in the tube, as clearly shown in the drawings. The tongues are then bent flat against the tube, and the device is thus in position for use and will hold the mail-matter securely in place, while by starting the tongue slightly and grasping the body of the fastening it can be pulled out easily at any time.

Another and perhaps better way of attaching the device to a tube is shown in Figs. 3 and 4. Here the arms 10 and 11 are bent up partially, as shown in Fig. 3, the short tongues on the arms 11 are undisturbed, the tongues 13 of the longer arms 10 are bent outward, as shown, and doubled over slightly at the ends, so as to engage the end of the tube after passing through the slots 14, and the device is pushed into the tube end. In this way the outer portions of the long tongues 13 can be made to engage the slots 14, so that the tongues can be thrust through, and then the tongues, which are very flexible, can be doubled around the end portion of the tube and their terminal portions bent sharply around the end wall of the tube, as the drawings clearly show. If desired, the shorter tongues 13 can be bent outward, so as to press against the tube-wall.

Another modification is shown in Fig. 5, where a disk 15 is attached to the body of the fastener, the disk having perforations $15^a$ in which the short tongues 13 can be inserted and fastened. The disk will thus serve as an abutment for the matter in the tube.

While I have shown the device applied to the inner side of the mail-tube, it might be applied with the arms doubled over the outside and the tongues thrust inward; but the effect would not be so good, and it could not be so easily applied.

It will be observed that my invention while providing a satisfactory fastening also permits the inspection of the matter within the tube, as one can look through the open portions of the fastening, and thus a glance will show that the government mail regulations are not being infringed.

Having thus described my invention, what I claim as new, and desire to secure by Letters Patent, is—

1. A device of the kind described, comprising a plurality of connected flexible arms shaped to fit a tube, the arms being longitudinally slotted and provided with struck-up tongues the free ends of which are toward the center of the device.

2. A mail-tube fastening, comprising a body having a plurality of radiating flexible arms longitudinally slotted and with tongues struck up therefrom, the free ends of the tongues being toward the center of the device.

3. A mail-tube fastening, comprising a body portion having a plurality of radiating flexible arms of different lengths, the arms being provided with flexible longitudinal tongues the free ends of which are toward the center of the device.

4. A device of the kind described, comprising a body having radial arms adapted to be bent to enter a tube, and longitudinal tongues struck up from the arms, the free ends of the tongues being toward the center of the fastening device.

5. The combination with a mail-tube, of a fastening device having a flexible body portion adapted to be pushed into the tube and have its outer portions thereby bent so as to press against the tube-walls with the body extending across the tube, and fastening-tongues struck up from the said body and arranged to project through the walls of the tube and double over upon the said walls.

In testimony whereof I have hereunto subscribed my name to this specification in the presence of two subscribing witnesses.

HARRY DEL MAR.

Witnesses:
WARREN B. HUTCHINSON,
JOHN G. DUNBAR.